US006158461A

United States Patent [19]
Frank et al.

[11] Patent Number: 6,158,461

[45] Date of Patent: Dec. 12, 2000

[54] DEVICE FOR SUPPLYING FUEL FROM A FUEL TANK

[75] Inventors: Kurt Frank, Schorndorf; Wolfgang Gabauer, Asperg, both of Germany

[73] Assignee: Robert Bosch GmbH, Stuttgart, Germany

[21] Appl. No.: 09/117,916

[22] PCT Filed: Jan. 9, 1998

[86] PCT No.: PCT/DE98/00055

§ 371 Date: Aug. 10, 1998

§ 102(e) Date: Aug. 10, 1998

[87] PCT Pub. No.: WO98/40619

PCT Pub. Date: Sep. 17, 1998

[30] Foreign Application Priority Data

Mar. 10, 1997 [DE] Germany ........................... 197 09 780

[51] Int. Cl.[7] ........................................ F02M 39/00

[52] U.S. Cl. .................... 137/574; 137/315; 137/565.16; 137/565.17; 123/509; 123/514

[58] Field of Search .............................. 137/574, 565.17, 137/565.36, 565.16, 315; 123/509, 514

[56] References Cited

U.S. PATENT DOCUMENTS

| | | | |
|---|---|---|---|
| 4,672,937 | 6/1987 | Fales et al. | 123/509 |
| 4,747,388 | 5/1988 | Tuckey | 123/514 |
| 4,780,063 | 10/1988 | Tuckey | 417/360 |
| 4,869,225 | 9/1989 | Nagata et al. | 123/514 |
| 5,396,872 | 3/1995 | Ruger | 137/574 |

FOREIGN PATENT DOCUMENTS 44 44 854 A1 6/1996 Germany .

*Primary Examiner*—A. Michael Chambers
*Attorney, Agent, or Firm*—Michael J. Striker

[57] ABSTRACT

A device for delivering fuel from a fuel tank includes reserve cup, which can be inserted into the fuel tank and fixed there in place in an end position, in which the device is assembled in the fuel tank, and a fuel delivery pump positioned in the reserve cup. For automatic drainage of the reserve cup during disassembly of the fuel delivery device from the fuel tank the reserve cup has a drain opening which is blocked by a blocking element in the end position of the reserve cup in the fuel tank, and is released for fuel drainage when the cup is lifted from its end position on the bottom of the fuel tank.

10 Claims, 2 Drawing Sheets

15 13 14 12 17 16 18 21 19 25 26 24 22 20 11 10 31 30 27 111 23 101 111a 28

DEVICE FOR SUPPLYING FUEL FROM A FUEL TANK

BACKGROUND OF THE INVENTION

DESCRIPTION OF THE PRIOR ART

The invention relates to a device for delivering fuel from a fuel tank of the species defined in the preamble of claim 1.

In such devices for delivering fuel for motor vehicles, also known as delivery modules, as for example known from DE 44 44 854 A1, the reserve cup with integrated delivery pump and integrated filler level gauge sealed by a flange constitutes a complete structural unit, which is inserted into the fuel tank and fastened therein. The fuel delivery line leading from the fuel tank to the internal combustion engine and the fuel return line coming from the internal combustion engine and leading into the fuel tank are slipped onto connectors embodied on the flange of the reserve cup. The reserve cup is connected with the tank content of the fuel tank via respective openings or pump units, for example intake injector pumps, and continuously receives fuel which, during operation of the internal combustion engine, is aspirated by the delivery pump from the reserve cup and pumped into the delivery line to the internal combustion engine.

In case of repair, for example, because of a defective delivery pump or a defective tank level gauge, the entire delivery module including the fuel containing reserve cup has to be removed from the fuel tank, wherein clumsy handling can lead to a fuel spill from the reserve cup and thus to contamination of the environment. This can be particularly problematic if, because of the design, the removal of the delivery module has to be conducted in the interior of the passenger area.

SUMMARY OF THE INVENTION

In contrast thereto, the delivery device in accordance with the invention has the advantage, that during the disassembly of the delivery device the reserve cup automatically drains, that is at such time when the delivery device is still inside of the fuel tank. The reserve cup is completely emptied the delivery device is removed from the fuel tank, so that the aforementioned danger of contamination by any released fuel is reliably avoid. During reinstallation of the delivery device into the fuel tank, the blocking means automatically effect the blocking of the drain opening, so that the reliable function of the installed delivery device remains assured.

Further advantageous developments and improvements of the delivery device of the present invention are possible by means of the steps recited in the claims.

In accordance with an advantageous embodiment of the invention, the disposition of the reserve cup in the fuel tank is structurally defined in such a way, that in its end position the reserve cup is seated on the bottom of the fuel tank. The drain opening is disposed in the cup bottom and the blocking of the drain opening by the blocking means is caused by placing the reserve cup on the tank bottom. As soon as the reserve cup is lifted off the tank bottom, the blocking means unblock the opening again. This structural design has the advantage, that assembly and disassembly of the delivery device can be easily performed and that the blocking means for blocking and unblocking the drain opening are achieved with little technical effort, wherein it is assured that the draining of the reserve cup has been largely completed prior to lifting the delivery device through the disassembly opening in the fuel tank.

In accordance with a preferred embodiment of the invention, the blocking means are constituted by a seal ring enclosing the drain opening in the cup bottom, which projects axially beyond the outer bottom surface of the bottom and is pressed down on the tank bottom in the end position of the reserve cup. In this way the blocking means for blocking and unblocking the drain opening can be achieved at minimal constructional effort.

In accordance with an alternative embodiment of the invention, the blocking means are constituted by a sealing element arranged on the outside of the cup bottom, which covers the drain opening, wherein the sealing element has been designed, vertically movable on the cup bottom in such a way, that it is pressed down on the drain opening when the reserve cup is placed on the tank bottom, and during lifting of the reserve cup from the tank bottom drops away from the drain opening. Such a realization of the blocking means leads to a strong blocking effect in the installed state of the delivery device, that also remains largely unaffected by installation tolerances, possible distortions of the reserve cup at the fuel tank, etc.

BRIEF DESCRIPTION OF THE DRAWINGS

The invention will be explained in more detail in the following description by means of exemplary embodiments shown in the drawings. Shown are in.

DESCRIPTION OF THE PREFERRED EMBODIMENTS

Figure 1:
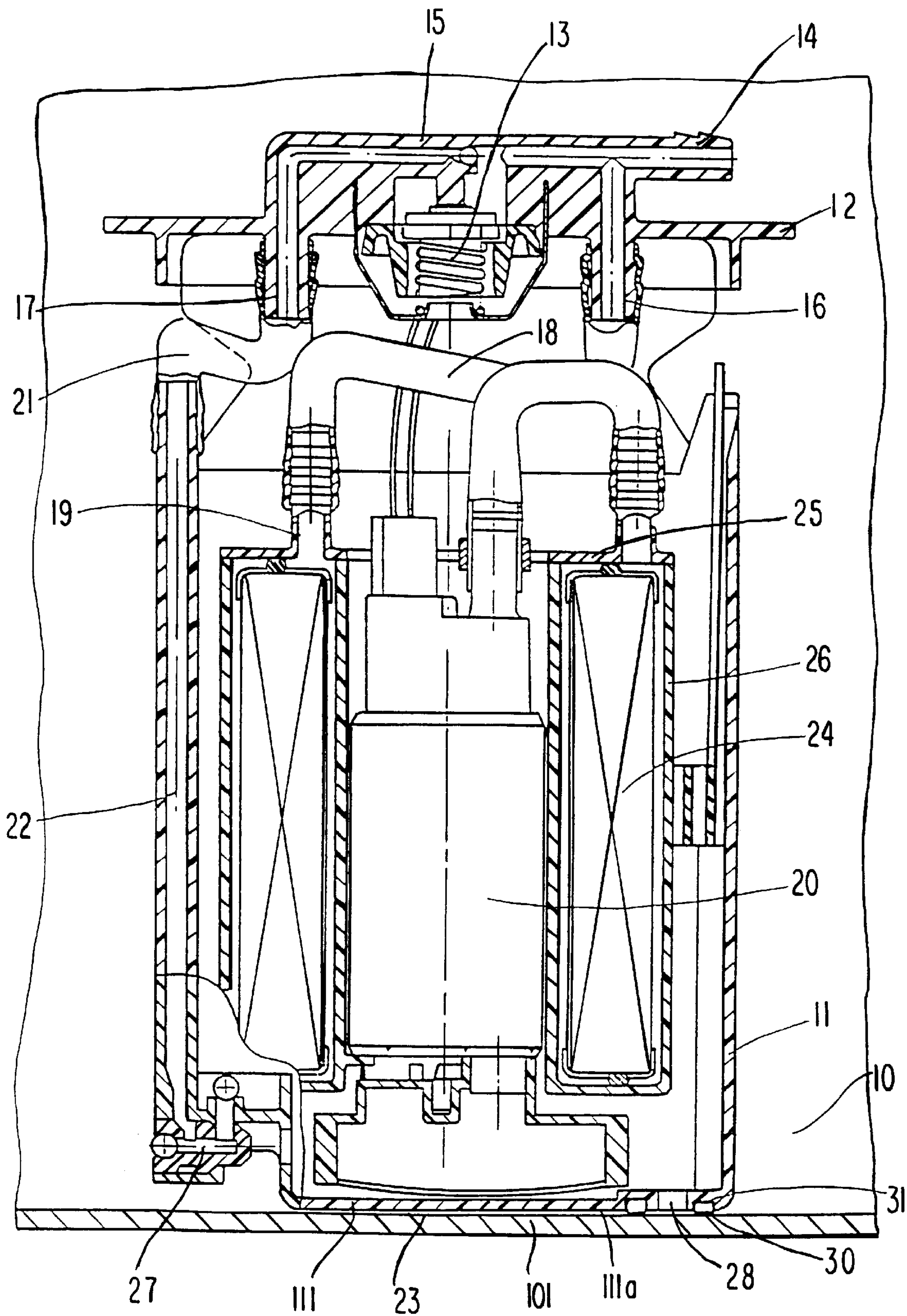
FIG. 1 is a partial longitudinal section of a fuel tank with an inserted delivery device and FIGS. 2 and 3 are respective partial views of a delivery device inserted into a fuel tank in its end position and in a raised position.

FIG. 1 shows a partial longitudinal section of a fuel tank 10, into which having a device for the delivery of fuel, also called a delivery unit or delivery module, has been inserted and fastened in the end position as shown in FIG. 1, by means not shown here, in the fuel tank 10. The device for the delivery of fuel comprises a reserve cup 11, whose cup opening can be blocked by means of a flange 12. In a known manner, the flange 12 has a pressure regulator 13 as well as a connector 14 for a fuel delivery line leading to the internal combustion engine, and a connector 15 for a fuel return line coming from the internal combustion engine. The connectors, 14, 15 protrude with parts of pipe 16, 17 through the flange 12 as far as into the interior of the reserve cup 11. A pressure hose 18 is slipped onto the part of pipe 16, connecting the connector 14 with a pressure tube 19 of a fuel delivery pump 20 held axially and radially immovable in the reserve cup 11. A connecting hose 21 is slipped onto the part of pipe 17, connecting the connector 15 with a submersible pipe 22 embodied in the reserve cup 11 and having its opening close to the bottom 111 of the reserve cup 11. The delivery pump 20, driven by an electric motor, aspirates fuel from the reserve cup 11 via a fuel pre-filter 23 disposed on its aspirating side, and pumps it via a main fuel filter 24 disposed downstream of its pressure side into the pressure tube 19. The delivery pump 20, the pre-filter 23 and the main fuel filter 24 are contained in a filter housing 26 covered by a filter cover 25, with the pressure tube 19 protruding through the filter cover 25. The reserve cup 11 is filled with fuel from the fuel tank 10 by means of an intake injection pump 27, which is operated by the fuel return flow leaving the submersible pipe 22. During operation of the internal combustion engine, the fuel delivery pump 20 driven by an electric motor delivers fuel from the reserve cup 11 via the pressure tube 19 and the pressure hose 18 to the connector 14 and on to the internal combustion engine via the delivery line connected to the connector 14. Any fuel not used there flows via the return line to the connector 15 connected with it and flows by way of the connecting hose 21 into the submersible pipe 22. The fuel flow exiting the submersible pipe 22 creates a vacuum in the intake injection pump 27, by means of which fuel is delivered from the fuel tank 10 into the reserve cup 11.

In order to be able in the course of repair work to remove the delivery device from the empty fuel tank 10 with the emptied reserve cup 11, the reserve cup 11 has a drain opening 28 for draining the cup, which, in the end position ready for operation of the reserve cup 11, is blocked in the fuel tank 10 by suitable blocking means and which, upon removal of the reserve cup 11, can be automatically released out of this end position.

In the exemplary embodiment of the device for delivering fuel as shown in FIG. 1, in its end position the reserve cup 11 has been directly placed on the bottom 101 of the fuel tank 10 and fastened on the fuel tank 10. The drain opening 28 is disposed in the cup bottom 111 of the reserve cup 11, and the blocking means come into effect upon placing the reserve cup 11 on the tank bottom 101, or respectively lifting the reserve cup 10 off the tank bottom 101, and block off the drain opening 28, or respectively unblock the drain opening 28.

In the exemplary embodiment shown in FIG. 1, the blocking means are realized by means of a sealing ring 30 fitted into an annular groove 31 which encloses the drain opening 28 and which has been cut into the outer bottom surface 111*a* of the bottom of the cup 111. The sealing ring 30 axially extends slightly over the outer bottom surface 111*a* of the cup bottom 111 and is pressed down on the bottom tank 101 when the reserve cup 11 is placed on the tank bottom 101 and fastened there, so that it hermetically blocks the drain opening 28.

Figure 2:
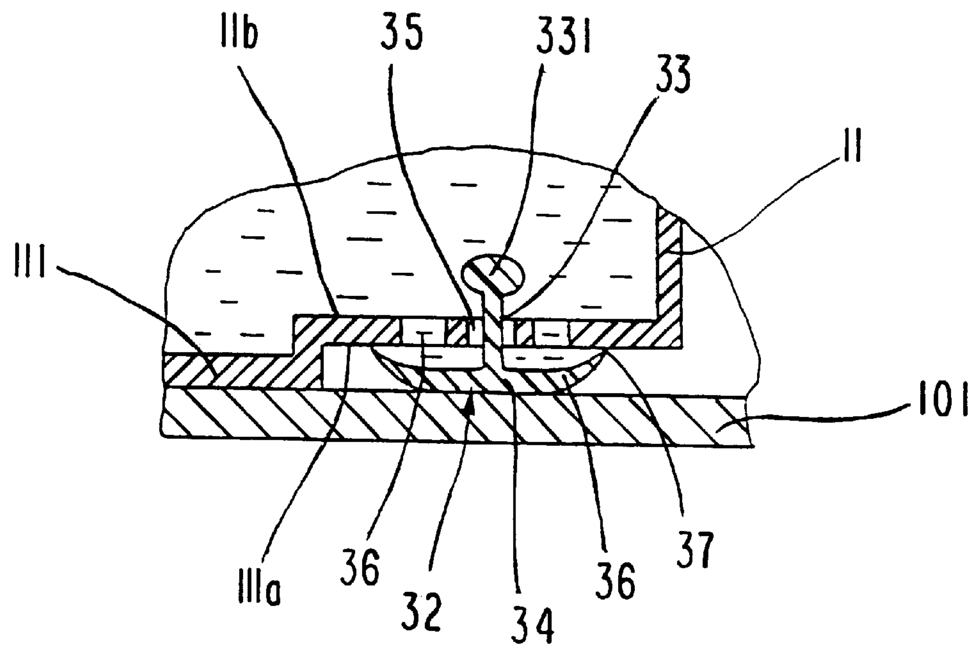
Figure 3:
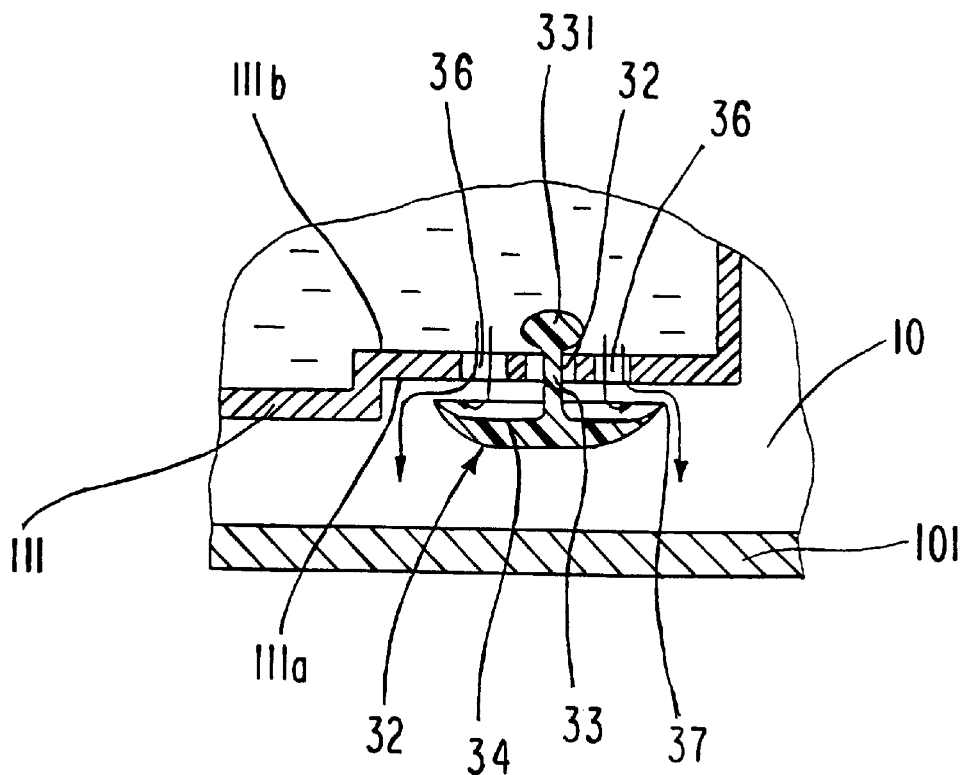

In a modified exemplary embodiment of the delivery device as shown in FIGS. 2 and 3, the blocking means are realized by means of a sealing element 32, which is disposed on the exterior of the cup bottom 111 and is fixed in place, vertically movable, on the cup bottom 111. The sealing element 32 is embodied in form of a mushroom, wherein on its free end facing away from the mushroom head 34, the mushroom stem 33 has a one-piece thickened end portion 331 of the stem, with which the sealing element 32 can be clipped into a support opening 35 provided in the cup bottom 111. The drain opening is here divided into a plurality of through-holes 36, which are arranged on a divisor circle which is concentric in respect to the support opening 35.

For assembly, the end portion 331 of the mushroom-shaped element 32 is pressed through the support opening 35, so that it then overlaps the support opening 35 on the inner bottom surface 111*b* of the cup bottom 111. A sealing edge 37 is formed on the exterior edge of the underside of the head 34 facing the tank bottom 101, which presses down on the outer bottom surface 111*a*, when the sealing element 32 is pressed on the cup bottom 111, and blocks off all through-holes 36 in respect to the fuel tank 10. In order to obtain a proper sealing effect, the diameter of the circumferential sealing edge 37 has been made significantly larger than the sum of the diameter of the divisor circle of the through-bore 36 and twice the diameter of a through-bore 36. In the end position of the reserve cup 11 inside the fuel tank 10 as shown in FIG. 2, the sealing element 32 is pressed by the tank bottom 101 on the cup bottom 111 and blocks off the drain opening comprised of the through-holes 36. When the mushroom head 34 presses down on the cup bottom 111, the mushroom stem 33 is pushed into the interior of the cup, in the course of which the end portion 331 is lifted off the inner bottom surface 111*b* of the cup bottom 111 (FIG. 2). When the reserve cup 11 is lifted after being disconnected from the fuel tank 10, the sealing element 32 drops off the outer bottom surface 111*a* of the cup bottom 111. The dropping movement of the sealing element 32 is stopped by the thickened end portion 331 at that moment, when the latter rests against the inner bottom surface 111*b* of the cup bottom 111. Because of the dropping away of the mushroom head 34 from the cup bottom 111 the through-holes 36 are unblocked and the fuel can drain from the reserve cup 11 into the fuel tank 10.

In order to assure the level resting of the reserve cup 11 on the tank bottom 111 of the fuel tank 10, the cup bottom 111 is depressed in the area of the support opening 35 and the through-holes 36, wherein the depth of the depression is slightly less than the axial thickness of the mushroom head 34, so that the mushroom head 34 can still be pressed down with sufficient contact pressure on the cup bottom 111 by the tank bottom 101.

What is claimed is:

1. A device for delivering fuel from a fuel tank into a fuel delivery line and insertable into the fuel tank, the device comprising a reserve cup (11) insertable into the fuel tank to be placed at the bottom thereof in an end position in which said reserve cup is fixed in place in the fuel tank, said reserve cup being filled with fuel when inserted into the fuel tank; a fuel delivery pump (20) mounted in said reserve cup for aspirating the fuel from said reserve cup and pumping the fuel into the fuel delivery line, said reserve cup having at least one drain opening (28;36); and blocking means (30;32) for blocking said drain opening when said reserve cup is in said end position and releasing said drain opening when said reserve cup is lifted from said end position so that said reserve cup is completely drained when the device is disassembled from and taken out from the fuel tank.

2. The device according to claim 1, wherein said reserve cup (11) is seated on a bottom (101) of said fuel tank (10) in said end position, said drain opening (28;36) being disposed in a bottom of said reserve cup, and wherein blocking of said drain opening (28;36) by said blocking means is effected by seating said reserve cup (11) on the bottom of said reserve cup and releasing of said drain opening (28;36) by said blocking means is effected by lifting the reserve cup (11) from said bottom of said fuel tank.

3. The device according to claim 2, wherein said blocking means includes a sealing ring (30) enclosing said drain opening (28) in the bottom of said reserve cup (111 ) and extending over an outer bottom surface (111*a*) of the bottom of said fuel tank (111) and is pressed onto the bottom of said fuel tank in said end position of said reserve cup.

4. The device according to claim 3, wherein said sealing ring (30) is fitted in an annular groove (31) cut into the said outer bottom surface (111*a*) of the bottom of said reserve cup and enclosing said drain opening.

5. The device according to claim 2, wherein said blocking means includes a sealing element (32) disposed on an exterior of said bottom of said reserve cup and covering said drain opening (36), said at least one sealing element being held vertically movable on said bottom of said reserve cup (111) such that said sealing element is pressed on said drain opening (36) when said reserve cup (11) is seated on said bottom of said fuel tank (101), and drops away from said at least one drain opening (36) when said reserve cup (11) is lifted off said bottom of said fuel tank.

6. The device according to claim 5, wherein said sealing element (32) has a flexible circumferential sealing edge (37) which presses on an outer bottom surface (111_a_) of the bottom of said reserve cup at a radial distance from said at least onedrain opening (36) when said reserve cup (11) is in said end position.

7. The device according to claim 5, wherein said sealing element (32) is clipped into a support opening (35) provided in the bottom of said reserve cup.

8. The device according to claim 7, wherein said sealing element (32) has a mushroom-like shape and has a mushroom-like head (34) and a stem (33) having a flexible thickened end portion, which can be pressed through said support opening (35) and overlaps said support opening on an inner bottom surface (111_b_) of the bottom of said reserve cup, said sealing edge (37) being formed on an outer edge of said mushroom-like head (34) facing the bottom of said reserve cup.

9. The device according to claim 8, wherein a plurality of drain openings are provided formed by through-holes arranged on a divisor circle in the bottom of said reserve cup, said divisor circle being disposed concentrically to said support opening (35).

10. The device according to claim 9, wherein a diameter of said circumferential sealing edge (37) is significantly larger than the sum of the diameter of the divisor circle and twice the diameter of each of said through-holes (36).

* * * * *